United States Patent
Shankar et al.

(10) Patent No.: US 10,062,156 B2
(45) Date of Patent: Aug. 28, 2018

(54) METHOD AND SYSTEM FOR DETECTING DEFECTS ON A SUBSTRATE

(71) Applicant: KLA-Tencor Corporation, Milpitas, CA (US)

(72) Inventors: Premchandra M. Shankar, Fremont, CA (US); Ashok Varadarajan, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 129 days.

(21) Appl. No.: 15/285,248

(22) Filed: Oct. 4, 2016

(65) Prior Publication Data

US 2017/0249732 A1    Aug. 31, 2017

Related U.S. Application Data

(60) Provisional application No. 62/299,879, filed on Feb. 25, 2016.

(51) Int. Cl.
    *G06T 7/00* (2017.01)

(52) U.S. Cl.
    CPC .......... *G06T 7/0004* (2013.01); *G06T 7/0008* (2013.01); *G06T 2207/10016* (2013.01); *G06T 2207/10052* (2013.01); *G06T 2207/20212* (2013.01); *G06T 2207/20216* (2013.01); *G06T 2207/20221* (2013.01); *G06T 2207/20224* (2013.01); *G06T 2207/30148* (2013.01)

(58) Field of Classification Search
    None
    See application file for complete search history.

(56) References Cited

U.S. PATENT DOCUMENTS

| 5,805,278 A | 9/1998 | Danko |
| 5,822,055 A | 10/1998 | Tsai et al. |
| 6,061,476 A * | 5/2000 | Nichani .................. G06K 9/38 382/145 |

(Continued)

OTHER PUBLICATIONS

"Signal-to-Noise Ratio (Imaging)." Wikipedia, Wikimedia Foundation, Apr. 10, 2018, en.wikipedia.org/wiki/Signal-to-noise_ratio_(imaging) (Year: 2018).*

(Continued)

*Primary Examiner* — Justin P. Misleh
(74) *Attorney, Agent, or Firm* — Suiter Swantz pc llo

(57) ABSTRACT

An inspection method includes receiving a plurality of inspection images of a substrate. The method includes generating a first noise image from a first image from the first channel and an additional noise image from the additional image from the additional channel. The method further includes generating a first signal-to-noise ratio (SNR) image from the first noise image and an additional SNR image from the additional noise image and identifying one or more first pixel candidates in the first SNR image and in the additional SNR image. The method further includes combining image data from the first SNR image and image data from the additional SNR image at common pixel candidate sites based on the one or more identified first pixel candidates and the one or more identified additional pixel candidates to form a combined image used to detect defects on the substrate.

22 Claims, 6 Drawing Sheets

(56) References Cited

U.S. PATENT DOCUMENTS

| | | |
|---|---|---|
| 6,621,570 B1 | 9/2003 | Danko |
| 6,702,302 B2 | 3/2004 | Smedt et al. |
| 7,092,082 B1 | 8/2006 | Dardzinski |
| 8,223,327 B2 | 7/2012 | Chen et al. |
| 8,467,047 B2 | 6/2013 | Chen et al. |
| 2005/0282299 A1 | 12/2005 | Kim et al. |
| 2010/0188657 A1 | 7/2010 | Chen et al. |
| 2010/0329540 A1 | 12/2010 | Bhaskar et al. |
| 2012/0086799 A1* | 4/2012 | Hess .................... G01N 21/94 348/125 |
| 2012/0122252 A1 | 5/2012 | Fujimori |
| 2012/0268735 A1 | 10/2012 | Chen et al. |
| 2013/0250287 A1 | 9/2013 | Chen et al. |
| 2014/0193065 A1 | 7/2014 | Chu et al. |
| 2015/0377797 A1 | 12/2015 | Kolchin et al. |

OTHER PUBLICATIONS

IEEE 100: The Authoritative Dictionary of IEEE Standards Terms. Institute of Electrical and Electronics Engineers, 2000, p. 1051 (Year: 2000).*

* cited by examiner

METHOD AND SYSTEM FOR DETECTING DEFECTS ON A SUBSTRATE

PRIORITY

The present application claims priority under 35 U.S.C. § 119(e) to U.S. Provisional Patent Application Ser. No. 62/299,879 entitled NOVEL ADAPTIVE CHANNEL FUSION ALGORITHM FOR LASER SCANNING SYSTEMS, filed Feb. 25, 2016, naming Premchandra M. Shankar and Ashok Varadarajan as inventors, which is incorporated herein by reference in the entirety.

TECHNICAL FIELD

The present invention generally relates to semiconductor wafer inspection, and more particularly, to the fusion of data from multiple inspection channels of a multi-channel inspection tool

BACKGROUND

Inspection processes are used at various steps during a semiconductor manufacturing process to detect defects on a specimen such as a reticle and wafer. Inspection processes have always been an important part of fabricating semiconductor devices such as integrated circuits. As demand for semiconductor devices increase the need for improved device inspection capabilities will also continue to increase. However, as the dimensions of semiconductor devices decrease, inspection processes become even more important to the successful manufacture of acceptable semiconductor devices. For instance, as the dimensions of semiconductor devices decrease, detection of defects of decreasing size has become necessary as even relatively small defects may cause unwanted aberrations in the semiconductor devices. In another instance, existing inspection algorithms provide a relatively simple way to detect defects with a multiple channel system. However, since the existing inspection algorithm for the multiple channel system uses signal intensity, there are cases when defect count varies significantly due to changes in illumination light levels and wafer-to-wafer variation. The impact is to cause defect inspection to be less adaptive to illumination and wafer-to-wafer variations.

Therefore, it is desirable to provide a system and method that cures the shortcomings of the previous approaches.

SUMMARY

A method for substrate inspection is disclosed, in accordance with one or more embodiments of the present disclosure. In one embodiment, the method includes, receiving a plurality of inspection images of a substrate, wherein the plurality of inspection images include two or more images from two or more channels of an inspection system. In another embodiment, the method includes generating a first noise image based on a first image from a first channel and an additional noise image based on an additional image from an additional channel. In another embodiment, the method includes generating a first signal-to-noise ratio image based on the first noise image and an additional signal-to-noise ratio image based on the additional noise image. In another embodiment, the method includes identifying one or more first pixel candidates in the first signal-to-noise ratio image and one or more additional pixel candidates in the additional signal-to-noise ratio image. In another embodiment, the method includes combining image data from the first signal-to-noise ratio image and image data from the additional signal-to-noise ratio image at common pixel candidate sites based on the one or more identified first pixel candidates and the one or more identified additional pixel candidates to form a combined image. In another embodiment, the method includes detecting defects on the substrate using the combined image.

An inspection apparatus is disclosed, in accordance with one or more embodiments of the present disclosure. In one embodiment, the inspection apparatus includes an inspection system for acquiring a set of inspection results from a substrate. In another embodiment, the apparatus includes a controller communicatively coupled to the inspection system. In another embodiment, the controller includes one or more processors for executing a set of program instructions stored in memory. In another embodiment, the set of program instructions is configured to cause the one or more processors to receive a plurality of inspection results of a substrate, wherein the plurality of inspection results includes a first image from a first channel of the inspection system and at least an additional image from an additional channel from the inspection system. In another embodiment, the set of program instructions is configured to cause the one or more processors to generate a first noise image based on the first image from the first channel and an additional noise image based on the additional image from the additional channel. In another embodiment, the set of program instructions is configured to cause the one or more processors to generate a first signal-to-noise ratio image based on the first noise image and an additional signal-to-noise ratio image based on the additional noise image. In another embodiment, the set of program instructions is configured to cause the one or more processors to identify one or more first pixel candidates in the first signal-to-noise ratio image and one or more additional pixel candidates in the additional signal-to-noise ratio image. In another embodiment, the set of program instructions is configured to cause the one or more processors to combine image data from the first signal-to-noise ratio image and image data from the additional signal-to-noise ratio image at common pixel candidate sites based on the one or more identified first pixel candidates and the one or more additional pixel candidates to form a combined image. In another embodiment, the set of program instructions is configured to cause the one or more processors to detect defects on the substrate using the combined image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 6B, the present disclosure is generally directed to a system and method of substrate inspection. The present disclosure is further directed to multi-channel substrate inspection, which allows for improvement in the stability and sensitivity of a defect detection algorithm, on a substrate with a laser scanning inspection system. The present disclosure improves multi-channel inspection by fusing pixel signal-to-noise ratio (SNR) information from two or more inspection channels. Further, embodiments of the present disclosure provide improved stability in terms of defect count in response to illumination level changes and wafer-to-wafer variation. Additional embodiments of the present disclosure provide more yield relevant results by improving defect of interest (DOI) detection ability and suppressing nuisances.

As used throughout the present disclosure, the term "wafer" generally refers to substrates formed of a semiconductor or non-semiconductor material. For example, a semiconductor or non-semiconductor material may include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed. One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

For the purposes of the present disclosure, the term "multi-channel" may refer to two or more inspection channels of a single inspection system or a first inspection channel of a first inspection system and an additional inspection channel of an additional inspection channel. In this regard, the term "multi-channel" should not be interpreted as a limitation to a single inspection system.

The combination of multiple images from an inspection tool is described generally in U.S. Patent Publication No. 2013/0250287, published on Sep. 26, 2013, which is incorporated herein by reference in the entirety. A multi-channel inspection system is described generally in U.S. Pat. No. 5,822,055, issued on Oct. 13, 1998, which is incorporated herein by reference in the entirety.

Figure 1:
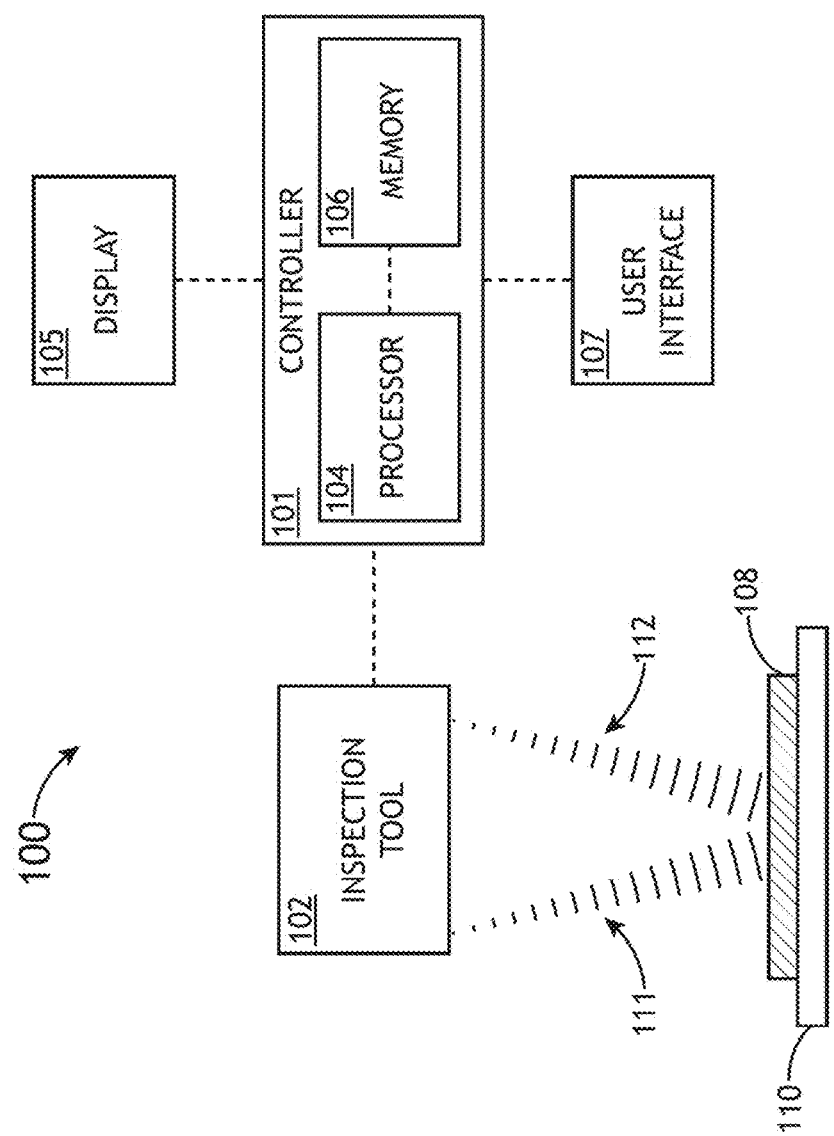
FIG. 1 illustrates a simplified schematic view of an inspection system, in accordance with one or more embodiments of the present disclosure.

FIG. 1 illustrates a simplified schematic view of an inspection system 100, in accordance with one or more embodiments of the present disclosure. In one embodiment, the inspection system 100 includes multiple channels. For example, the inspection system 100 may include a first channel 111 and at least an additional channel 112. For instance, a first image may be defined by the first channel 111 of the inspection system 100. In another instance, additional image data may be defined by the additional channel 112 of the inspection system 100. Additionally and/or alternatively, a first channel 111 may be associated with a first inspection system and the additional channel 112 may be associated with an additional inspection system.

The inspection tool 102 may include any inspection tool or system known in the art, such as, but not limited to, a bright field inspection tool or a dark field inspection tool. Further, although not shown, the inspection tool 102 may include an illumination source, a detector and various optical components for performing inspection (e.g., lenses, mirrors, beam splitters and the like) on the sample 108. Examples of currently available wafer inspection tools are described in detail in U.S. Pat. Nos. 7,092,082, 6,702,302, 6,621,570, 5,805,278, 8,223,327 and 8,467,047 which are each herein incorporated by reference in the entirety.

In one embodiment, the inspection system 100 includes any illumination source known in the art. For example, the illumination source may include a narrow band light source, such as, but not limited to, a laser source. By way of another example, the illumination source may be configured to direct light to the surface of the sample 108 (via various optical components) disposed on the sample stage 110. Further, the various optical components of the inspection tool 102 may be configured to direct light reflected and/or scattered from the surface of an inspection region of the sample 108 to the detector of the inspection tool 102.

The one or more detection channels of the multiple-channels 111, 112 of inspection system 100 may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the output acquisition subsystem may be signals or data, but not image signals or image data. In such instances, one or more processors 104 of the system 100 may be configured to generate images of the wafer from the non-imaging output of the detectors. However, in other instances, the detectors may be configured as imaging detectors that are configured to generate imaging signals or image data. Therefore, the system may be configured to generate the images described herein in a number of ways.

In another embodiment, the system 100 includes a controller 101. In one embodiment, the controller 101 is communicatively coupled to the inspection tool 102. For example, the controller 101 may be communicatively coupled to one or more detectors of the inspection tool 102. In this regard, the controller 101 may be configured to detect defects on sample 108 using image data collected, processed, and transmitted by the detector.

The controller 101 is coupled to the one or more detectors of the inspection tool 102 in any suitable manner (e.g., by one or more transmission media indicated by the dotted line shown in FIG. 1) such that the controller 101 can receive the output generated by the detector. In another embodiment, the controller 101 of the system 100 may be configured to receive and/or acquire data or information from other systems (e.g., inspection results from an additional inspection system or metrology results from a metrology system) by a transmission medium that may include wireline and/or wireless portions. In this manner, the transmission medium may serve as a data link between the one or more controllers 101 and other subsystems of the system 100. In another instance, the one or more controllers 101 may send data to external systems via a transmission medium (e.g., network connection).

In another embodiment, the controller 101 includes one or more processors 104. In another embodiment, the controller 101 includes a non-transitory medium 106 (i.e., memory medium) communicatively coupled to the one or more processors 104. For example, the memory medium 106 may store program instructions for causing the one or more processors 104 to carry out the various steps described through the present disclosure. The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired Further, the one or more processors 104 may include a desktop computer, mainframe computer system, workstation, image computer, parallel processor, or other computer system (e.g., networked computer) configured to execute a program configured to operate the system 100, as described throughout the present disclosure. For example, the one or more processors 104 may include any one or more processing elements known in the art. In this sense, the one or more processors 104 may include any microprocessor-type device configured to execute software algorithms and/or instructions. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 106. Moreover, different subsystems of the system 100 (e.g., display 105 or user interface 107) may include a processor or logic elements suitable for carrying out at least a portion of the steps described throughout the present disclosure. Therefore, the above description should not be interpreted as a limitation on the present invention but merely an illustration.

In one embodiment, the inspection system 100 includes any memory medium 106 known in the art suitable for storing program instructions executable by the associated one or more processors 104. For example, the memory medium 106 may include, but is not limited to, a read-only memory, a random access memory, a magnetic or optical memory device (e.g., disk), a magnetic tape, a solid state drive and the like. It is noted herein that the memory 106 medium is configured to store one or more results from inspection tool 102 and/or the output of the various steps described herein. It is further noted that memory medium 106 may be housed in a common controller housing with the one or more processors 104. For instance, the memory medium 106 may be located remotely with respect to the physical location of the processors and controller 101. In another instance, the one or more processors 104 of controller 101 may access a remote memory medium (e.g., server), accessible through a network (e.g., internet, intranet and the like).

In one embodiment, the inspection system 100 includes a display 105. For example, the display 105 may be communicatively coupled to the controller 101. By way of another example, the display 105 may be communicatively coupled to one or more processors 104 of controller 101. In this regard, the one or more processors 104 may display one or more of the various results of the present disclosure on the display 105. For instance, the display device 105 may include any display device known in the art. In another instance, the display device 105 may include, but is not limited to, a liquid crystal display (LCD).

Further, the display device 105 may include, but is not limited to, an organic light-emitting diode (OLED) based display. For example, the display device 105 may include, but is not limited to a CRT display. Those skilled in the art should recognize that a variety of display devices 105 may be suitable for implementation in the present disclosure and the particular choice of display device 105 may depend on a variety of factors, including, but not limited to, form factor, cost, and the like. In a general sense, any display device capable of integration with a user interface device 107 (e.g., touchscreen, bezel mounted interface, keyboard, mouse, trackpad, and the like) is suitable for implementation in the present invention. In another embodiment, described further herein, the display 105 is used to display data to a user (not shown). In turn, a user may input selection and/or instructions (e.g., a user selection of inspection regions) responsive to inspection data displayed to the user via display device 105. For example, the display device 105 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of the display device 105 is suitable for implementation in the present invention.

In one embodiment, the inspection system 100 includes a user interface device 107. For example, the user interface device 107 may be communicatively coupled to the one or more processors 104 of controller 101. By way of another example, the user interface device 107 may be utilized by controller 101 to accept selections and/or instructions from a user. For instance, the user interface device 107 may include any user interface known in the art. In another instance, the user interface 107 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present invention. Further, the user interface 107 may include, but is not limited to, a bezel mounted interface.

In another embodiment, the system 100 inspects the sample 108 disposed on a sample stage 110. For example, the sample stage 110 may include any appropriate mechanical and/or robotic assembly known in the art.

Figure 2:
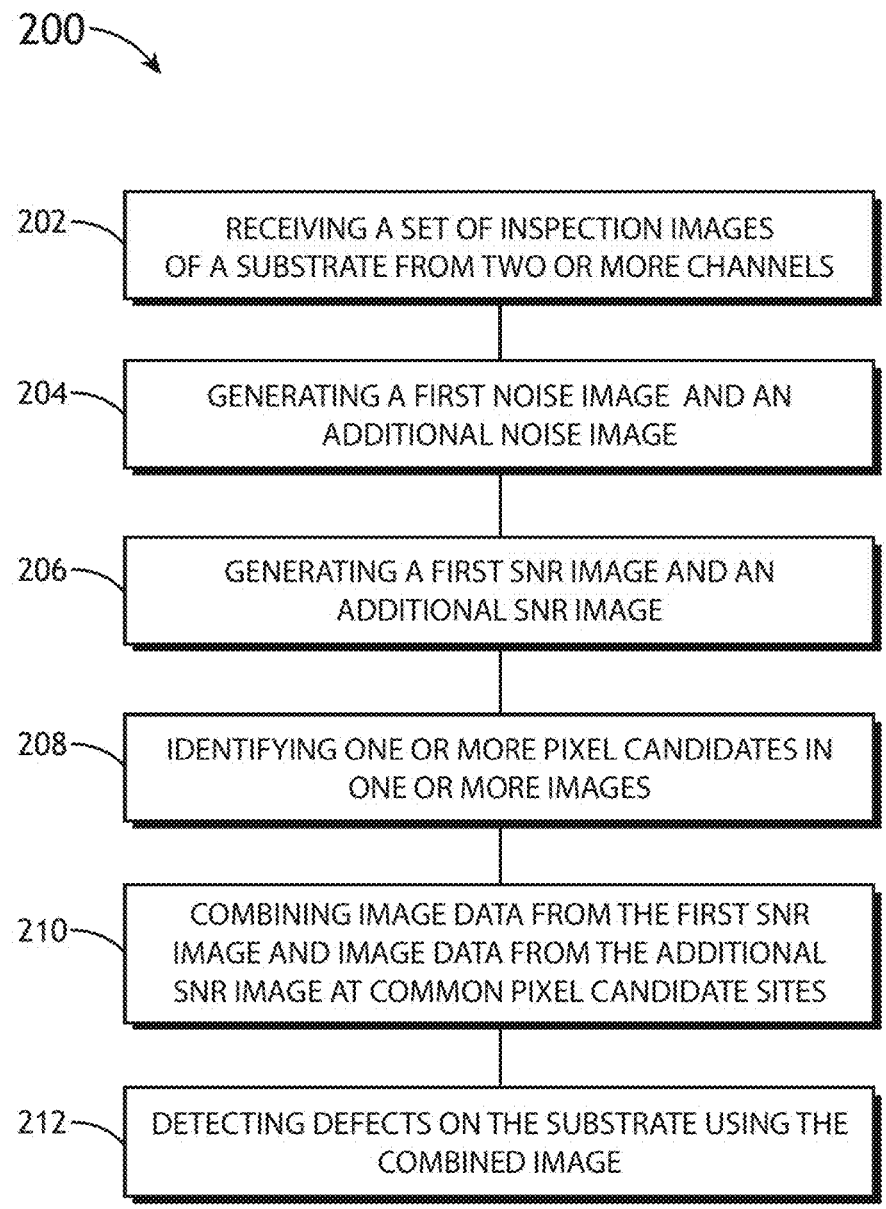
FIG. 2 is a flow diagram illustrating steps performed in a method for multi-channel fusion substrate inspection, in accordance with one or more embodiments of the present disclosure.

FIG. 2 is a flow diagram illustrating steps performed in method 200 for multi-channel fusion substrate inspection, in accordance with one or more embodiments of the present disclosure. It is noted herein that the steps of method 200 may be implemented all or in part by the inspection system 100. It is further recognized, however, that the method 200 is not limited to the inspection system 100 in that additional or alternative system-level embodiments may carry out all or part of the steps of method 200.

Figure 3A:
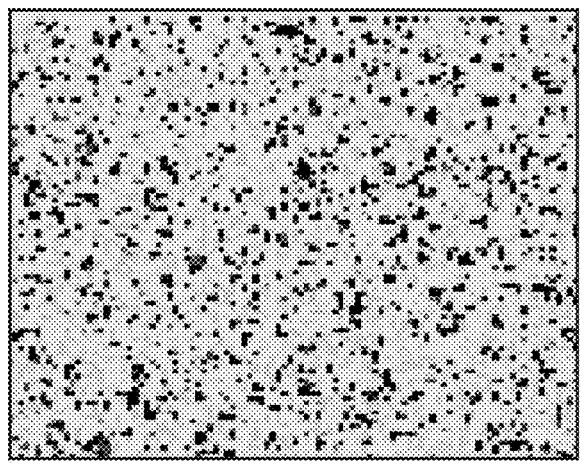
FIG. 3A illustrates an inspection image acquired with a first channel of the inspection system, in accordance with one or more embodiments of the present disclosure.
Figure 3B:
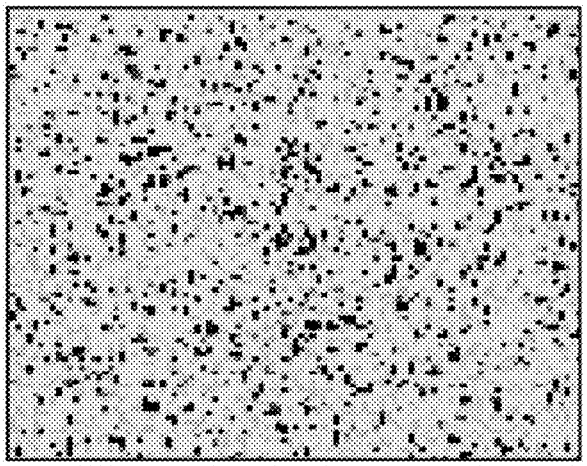
FIG. 3B illustrates an additional inspection image acquired with an additional channel of the inspection system, in accordance with one or more embodiments of the present disclosure
Figure 4A:
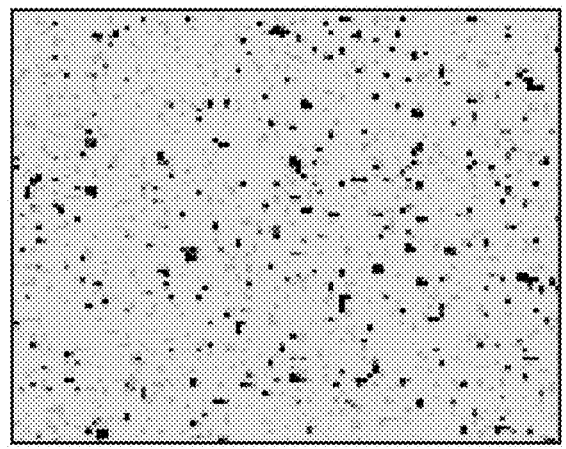
FIG. 4A illustrates a first signal-to-noise ratio (SNR) image from the first channel of the inspection system, in accordance with one or more embodiments of the present disclosure.
Figure 4B:
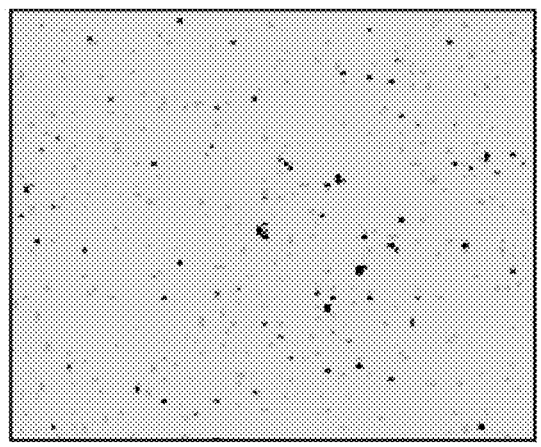
FIG. 4B illustrates an additional signal-to-noise ratio (SNR) image from an additional channel of the inspection system, in accordance with one or more embodiments of the present disclosure.

In a first step 202, in one embodiment, a set of multi-channel inspection images of a sample is received. In one embodiment, the set of multi-channel inspection images includes a first image from a first inspection channel and an additional image from an additional inspection channel. FIGS. 3A and 3B depict inspection images 310 and 320 acquired from a first inspection channel 111 and a second inspection channel 112 respectively. For example, inspection images may be received by controller 101 from inspection tool 102. In one embodiment, the inspection images may be stored in memory medium 106. In this regard, the inspection system 100 may store the inspection images and later access them for analysis. The inspection images received by the controller 101 may include any type of inspection data known in the art. For instance, the inspection images may include, but are not limited to, bright field (BF) inspection data or dark field (DF) inspection data.

In another embodiment, multiple inspection images are acquired and averaged prior to application of the following analysis steps. For example, for a given inspection channel, multiple inspection images from the inspection channel may be acquired and averaged to render the inspection image analyzed by the embodiments of the present disclosure.

In a second step 204, a first noise image is generated based on a first image from the first inspection channel and an additional noise image is generated based on an additional image from the additional inspection channel. For example, a first noise image from the first channel 111 of inspection tool 102 and an additional noise image from the additional channel 112 of inspection tool 102 are generated with controller 101.

It is noted that the first noise image and additional noise image may be generated utilizing a number of procedures. In one embodiment, the first and/or additional noise images are calculated by taking a global average of the difference between multiple inspection images. In another embodiment, the first and/or additional noise images are calculated by taking a spatially local average of the difference between multiple pixels between inspection images. In another embodiment, the first and/or additional noise images are calculated by taking an average of the process variation at different pixel intensities between inspection images.

In one embodiment, the noise images are generated from either inspection images from the same channel or from different channels. For instance, any of the noise calculation procedures discussed above may be applied to a set of images acquired from the same inspection channel or a set of images acquired from different inspection channels. For example, a noise image of the first channel 111 may be generated using two or more inspection images (of step 202) acquired with the first channel 111, while a noise image of the additional channel 112 may be generated using two or more inspection images (of step 202) acquired with the additional channel 112. By way of another example, a noise image of the first channel 111 and/or the additional channel 112 may be generated using one or more images from the first channel 111 and one or more images from the additional channel 112.

In a third step 206, in one embodiment, a first signal-to-noise ratio (SNR) image based on the first noise image and an additional signal-to-noise ratio (SNR) image based on the additional noise image are generated. For example, the first SNR image, shown in FIG. 4A, may be generated from the first noise image generated in step 204. By way of another example, the additional SNR image, shown in FIG. 4B, may be generated from the additional noise image generated in the second step 204 depicted in FIG. 2. In one embodiment, the first and additional SNR images are calculated by forming an image based on the inspection image(s) of step 202 and the noise image(s) of step 204. For example, the first and additional SNR images may be calculated based on the inspection signals and noise values at each pixel acquired from the inspection image(s) of step 202 and the noise image(s) of step 204. For instance, the first and additional SNR images for the first and/or additional channels 111, 112 may be calculated as the ratio of the signal (found in step 202) and noise value for a given pixel (found in step 204). In this regard, an SNR image is formed, whereby each pixel represents the signal-to-noise ratio at that pixel. It is further noted that the calculation of SNR for each pixel of the SNR image may be carried out using any number of image aggregation/processing techniques. For example, a local averaging procedure may be implemented, whereby a neighboring number of pixel values are used to calculate the particular value (e.g., signal, noise or SNR) at the given pixel. For instance, for a given pixel, the neighboring N pixels (e.g., eight pixels) may be used to calculate an average of one or more of signal, noise or SNR.

In a fourth step 208, one or more first pixel candidates and one or more additional pixel candidates are identified. In one embodiment, one or more pixel candidates may be identified utilizing the SNR images calculated in step 206. For example, a threshold (i.e., a threshold pixel value) may be applied to the SNR images associated with the first channel 111 and the additional channel 112 in order to identify pixel candidates in the image data acquired with the first channel 111 and additional channel 112 respectively. In this regard, pixels in the SNR images displaying an SNR value above the selected SNR threshold may be identified as pixel candidates. The procedure may be applied to SNR images associated with the first channel 111 and/or the additional channel 112. It is noted herein that the SNR threshold used to select one or more of the pixel candidate(s) may differ depending on inspection conditions and requirements.

In another embodiment, one or more pixel candidates may be identified utilizing the images acquired in step 202. For example, a threshold (i.e., a threshold pixel value) may be applied to the images associated with the first channel 111 and the additional channel 112 (acquired in step 202) in order to identify pixel candidates in the image data acquired with the first channel 111 and additional channel 112 respectively. In this regard, pixels in the acquired images displaying an inspection intensity above the selected signal threshold may be identified as pixel candidates. The procedure may be applied to SNR images associated with the first channel 111 and/or the additional channel 112. It is noted herein that the signal threshold used to select one or more of the pixel candidate(s) may differ depending on inspection conditions and requirements.

Figure 5:
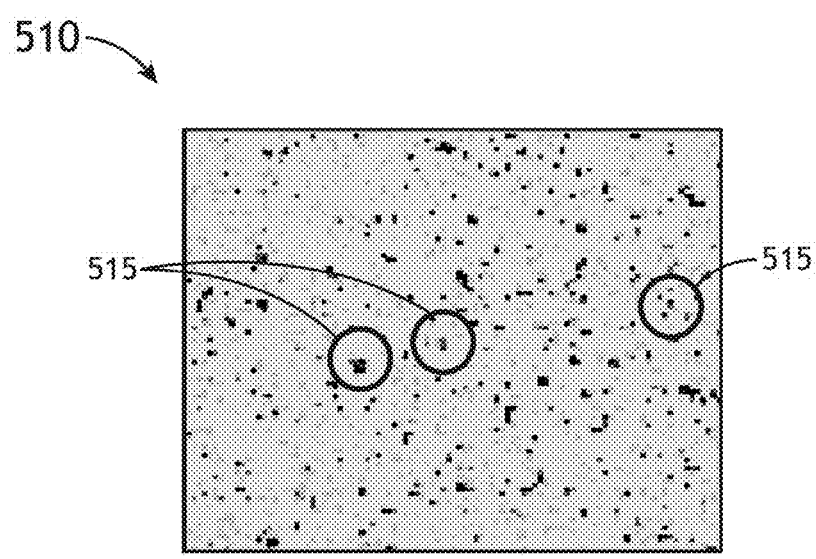
FIG. 5 illustrates one or more pixel candidates identified in a signal-to-noise ratio (SNR) image, in accordance with one or more embodiments of the present disclosure.

For instance, as shown in FIG. 5, in a given SNR image, the controller 101 may apply a selected SNR threshold. The one or more pixel candidates 515, as shown in image 510, having an SNR value above the selected SNR threshold may be identified with controller 101 as pixel candidates (for use in step 210)

In a fifth step 210, image data from the first signal-to-noise ratio image and image data from the additional signal-to-noise ratio image are combined based on the one or more identified first pixel candidates and the one or more identified additional pixel candidates to form a combined image. For example, image data from the first signal-to-noise ratio image and image data from the additional signal-to-noise ratio image (step 206) may be combined, at common pixel candidate sites, based on the one or more identified first pixel candidates and the one or more identified additional pixel candidates to form a combined image or fused image.

Figure 6A:
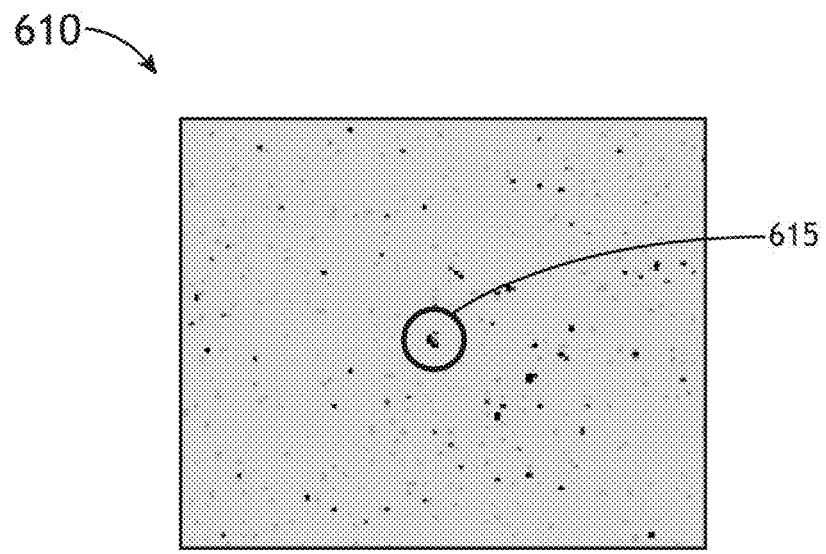
FIG. 6A illustrates a combined image of two of more signal-to-noise ratio (SNR) images from two or more channels of an inspection system, in accordance with one or more embodiments of the present disclosure.

The combination or fusion of images may be carried out in any suitable manner. For example, SNR images from the first inspection channel 111 and the additional inspection channel 112 may be added together to form a fused image. By way of another example, SNR images from the first inspection channel 111 and the additional inspection channel 112 may be multiplied together (e.g., corresponding pixels are multiplied together or average pixel neighborhood values are multiplied together) to form a fused image. In another example, SNR images from the first inspection channel 111 and the additional inspection channel 112 may be combined by applying a weighted sum of the pixel values from the SNR images of the first inspection channel 111 and the additional inspection channel 112. In another example, SNR images from the first inspection channel 111 and the additional inspection channel 112 may be combined by applying a weighted product of the pixel values from the SNR images of the first inspection channel 111 and the additional inspection channel 112. It is noted herein that combining or fusing the image data may allow user(s) to extract defects with weak signals and suppress noise. FIG. 6A illustrates a combined image based on two or more SNR images from two or more channels of an inspection tool 102. As shown in FIG. 6A, identified defect 615 may be easily distinguishable from background noise. It is noted that the background noise level for the combined image 610 shown in FIG. 6A is lower than that of the first SNR image 410 shown in FIG. 4A and the second SNR image 420 shown in FIG. 4B.

In another embodiment, combining the image data from the two or more SNR images at common pixel candidate sites may be performed separately for individual pixels. In another embodiment, combining the image data from the two or more SNR images at common pixel candidate sites may be performed in a simultaneous manner. In another embodiment, the image data from the two or more SNR images is analyzed at common pixel candidate site neighborhoods. For example, the image data from common pixel candidate site neighborhoods from two or more SNR images from different channels may be multiplied together and the product summed. For instance, the image data from a 5 pixel by 5 pixel neighborhood that surrounds a common pixel candidate site may be multiplied together and the product summed. It is noted herein that fusing image data may allow user(s) to leverage both magnitude (intensity) and phase (correlation) information.

It is contemplated that, while the method described above includes combining the image data from two or more SNR images at common pixel candidate sites to generate a combined image, the present disclosure is not limited to combining the image data from two or more SNR images at common pixel candidate sites to form a single combined image. In one embodiment, the present disclosure includes generating a second combined image. In another embodiment, the second combined image may also be used for defect detection to supplement and/or improve inspection images. For example, the combined image obtained from combining the inspection image from the two or more SNR images at common pixel candidate sites may be used further to combine with image data from another SNR image at common pixel candidate sites to generate the second combined image. It is noted herein that, while the present disclosure focuses on combining the image data from two or more SNR images a single time, the number of combination step may not be limited to being performed once. For example, the combination step of the present disclosure may be performed two or more times until it satisfies the substrate inspection requirements.

In one embodiment, the method described above includes combining processed image data (e.g., processed with the steps described above) with unprocessed image data. In another embodiment, the method described above includes generating a combined or fused image using images from different inspection systems. For example, the method described above includes generating a combined or fused image using images acquired from different inspection systems while in the same optical state. In another embodiment, the method described above includes generating images with different inspection systems including but not limited to, a dark field or bright field inspection system. As used herein, the term "optical state" is generally defined by values for different optical parameters of an inspection system or inspection systems. The different optical parameters may include wavelength of illumination, wavelength of collection, wavelength of detection, polarization of illumination, polarization of collection, polarization of detection, illumination angle, collection angle, detection angle, pixel size, and the like. In addition, the term "first" and "additional" generally refers to different optical states with different values for one or more of the optical parameters of the inspection system.

Figure 6B:
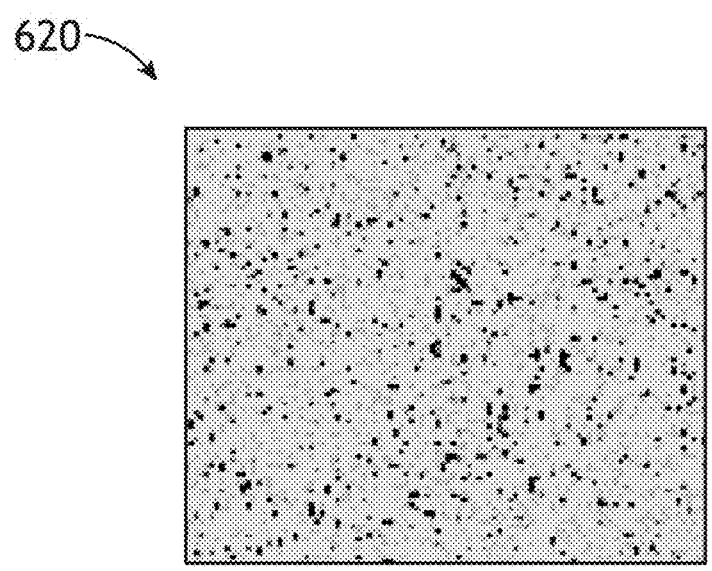
FIG. 6B illustrates a combined image produced from two or more images from one or more channels of one or more inspection systems, in accordance with one or more embodiments of the present disclosure.

FIG. 6B illustrates a combined image 620 of a substrate sample formed without application of method steps 202-210 of method 200 of the present disclosure. It is noted herein that FIG. 6A has a lower noise level and therefore a larger SNR than FIG. 6B. It is further noted herein that the larger SNR in FIG. 6A, compared to FIG. 6B, makes identification of pixel candidate sites easier in FIG. 6A.

In a sixth step 212, in one embodiment, defects on the substrate are detected using the combined image. In one embodiment, defects detected on the substrate using the combined image may include any defects known in the art. It is noted herein the defects detected on the sample may vary depending on characteristics of the substrate and substrate inspection conditions. In another embodiment, the detection step using the combined image includes applying one or more defect detection thresholds to the combined image. In another embodiment, detection of the one or more defects includes applying one or more defect detection algorithms. For example, a defect detection algorithm(s)

used in step 212 may include, but is not limited to, a segmented auto-thresholding (SAT) or multiple die auto-thresholding (MDAT) may be used for defect detection.

In one embodiment, based on the defects detected in step 212, the controller 101 may adjust one or more parameters of an associated fabrication line. For example, in the case where inspection of the present disclosure is being carried out on semiconductor wafers at one or more steps of a semiconductor device fabrication facility, the controller 101 may provide feedback and/or feedforward instructions to one or more processing tools of the fabrication facility. For instance, in some cases, in response to the detection of some defects, the controller 101 may provide feedback instructions to one or more upstream process tools in order to adjust the related process as it is applied to subsequent wafers so as to avoid or reduce the number of defects created on the subsequent wafers. In another instance, in some cases, in response to the detection of some defects, the controller 101 may provide feedforward instructions to one or more downstream process tools in order to adjust downstream processes to be applied to the wafer (analyzed by the method above) so as to mitigate the impact of the detected defects.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for providing substrate inspection comprising:
   receiving a plurality of inspection images of a substrate, wherein the plurality of inspection images include two or more images from two or more channels of an inspection system;
   generating a first noise image based on a first image from a first channel and an additional noise image based on an additional image from an additional channel;
   generating a first signal-to-noise ratio image based on the first noise image and an additional signal-to-noise ratio image based on the additional noise image;
   identifying one or more first pixel candidates in the first signal-to-noise ratio image and one or more additional pixel candidates in the additional signal-to-noise ratio image;
   combining image data from the first signal-to-noise ratio image and image data from the additional signal-to-noise ratio image at common pixel candidate sites based on the one or more identified first pixel candidates and the one or more identified additional pixel candidates to form a combined image; and
   detecting defects on the substrate using the combined image.

2. The method of claim 1, wherein the inspection system comprises:
   at least one of an optical inspection system or an electron beam inspection system.

3. The method of claim 1, wherein the first channel is associated with a first inspection system and the additional channel is associated with an additional inspection system.

4. The method of claim 1, wherein the first channel and the additional channel are associated with a single inspection system.

5. The method of claim 1, wherein the generating a first noise image based on the first image from the first channel and an additional noise image based on the additional image from the additional channel comprises:
   calculating the first noise image using one or more inspection images from the first channel and calculating the additional noise image using one or more inspection images from the additional channel.

6. The method of claim 5, wherein the calculating the first noise image using one or more inspection images from the first channel and calculating the additional noise image using one or more inspection images from the additional channel comprise:
   calculating the first noise image using one or more inspection images from the first channel and calculating the additional noise image using one or more inspection images from the additional channel via the one or more averaging procedures.

7. The method of claim 1, wherein the identifying one or more first pixel candidates in the first signal-to-noise ratio image and one or more additional pixel candidates in the additional signal-to-noise ratio image comprises:
   applying a threshold to at least one of the first signal-to-noise ratio image or the additional signal-to-noise ratio image.

8. The method of claim 1, wherein the combined image has higher signal-to-noise ratio than at least the first image from the first channel of the inspection system or the additional image from the additional channel from the inspection system.

9. The method of claim 1, wherein the combined image has lower noise than at least the first image from the first channel of the inspection system or the additional image from the additional channel from the inspection system.

10. The method of claim 1, wherein the inspection system comprises:
    at least one of a dark field inspection system or a bright field inspection system.

11. The method of claim 1, wherein the substrate comprises:
    a wafer.

12. An inspection apparatus comprising:
    an inspection system for acquiring a set of inspection results from a substrate; and
    a controller communicatively coupled to the inspection system, the controller including one or more processors for executing a set of program instructions stored in memory, the set of program instructions configured to cause the one or more processors to:
    receive a plurality of inspection results of a substrate, wherein the plurality of inspection results includes a first image from a first channel of the inspection system and at least an additional image from an additional channel from the inspection system;
    generate a first noise image based on the first image from the first channel and an additional noise image based on the additional image from the additional channel;
    generate a first signal-to-noise ratio image based on the first noise image and an additional signal-to-noise ratio image based on the additional noise image;
    identify one or more first pixel candidates in the first signal-to-noise ratio image and one or more additional pixel candidates in the additional signal-to-noise ratio image;
    combine image data from the first signal-to-noise ratio image and image data from the additional signal-to-noise ratio image at common pixel candidate sites based on the one or more identified first pixel candidates and the one or more additional pixel candidates to form a combined image; and
    detect defects on the substrate using the combined image.

13. The inspection apparatus of claim 12, wherein the inspection system comprises:
    at least one of an optical inspection system or an electron beam inspection system.

14. The inspection apparatus of claim 12, wherein the first channel is associated with a first inspection system and the additional channel is associated with an additional inspection system.

15. The inspection apparatus of claim 12, wherein the first channel and the additional channel are associated with a single inspection system.

16. The inspection apparatus of claim 12, wherein the one or more processors are configured to generate a first noise image from the first image from the first channel and an additional noise image from the additional image from the additional channel by calculating the first noise image using one or more inspection images from the first channel and calculating the additional noise image using one or more inspection images from the additional channel.

17. The inspection apparatus of claim 16, wherein the one or more processors are configured to generate a first noise image based on the first image from the first channel and an additional noise image based on the additional image from the additional channel by calculating the first noise image using one or more inspection images from the first channel and calculating the additional noise image using one or more inspection images from the additional channel via one or more averaging procedures.

18. The inspection apparatus of claim 12, wherein the one or more processors are configured to apply a threshold to at least one of the first signal-to-noise ratio image or the additional signal-to-noise ratio image.

19. The inspection apparatus of claim 12, wherein the combined image has higher signal-to-noise ratio than at least the first image from the first channel of the inspection system or the additional image from the additional channel from the inspection system.

20. The inspection apparatus of claim 12, wherein the combined image has lower noise than at least the first image from the first channel of the inspection system or the additional image from the additional channel from the inspection system.

21. The inspection apparatus of claim 12, wherein the inspection system comprises:
   at least one of a dark field inspection system or a bright field inspection system.

22. The inspection apparatus of claim 12, wherein the substrate comprises:
   a wafer.

* * * * *